Dec. 26, 1972     H. M. PATEL     3,707,396
METHOD OF PREVENTING GELLING OF PHOSPHOR COMPOSITION
PRIOR TO APPLICATION TO CATHODE RAY TUBE FACEPLATE
Filed Dec. 7, 1967

WITNESSES:
Helen M. Farkas
James F. Young

INVENTOR
Himanshu M. Patel
BY
Charles F. Renz
ATTORNEY

United States Patent Office 3,707,396
Patented Dec. 26, 1972

3,707,396
METHOD OF PREVENTING GELLING OF PHOSPHOR COMPOSITION PRIOR TO APPLICATION TO CATHODE RAY TUBE FACEPLATE
Himanshu M. Patel, Pine City, N.Y., assignor to Westinghouse Electric Corporation, Pittsburgh, Pa.
Filed Dec. 7, 1967, Ser. No. 688,896
Int. Cl. H01j 31/20
U.S. Cl. 117—33.5 C                          2 Claims

ABSTRACT OF THE DISCLOSURE

The invention relates to color television tubes and more particularly to screen structures and the method of manufacture of screens incorporating certain oxide phosphors such as yttrium or gadolinium oxide activated with europium.

More particularly, the invention is directed to the provision of a protective coating on the phosphor particles in which a photosensitized polyvinyl alcohol binder is used to prevent gelling prior to application by the slurry process.

BACKGROUND OF THE INVENTION

In the art of manufacturing screens for color television tubes in which a plurality of color producing phosphors are provided on the screen in a suitable dot-like or various other arrangements, one process consists of applying the phosphors to the faceplate of the color television tube in slurry form. The normal slurry includes a water-soluble polymer such as polyvinyl alcohol sensitized with a photosensitizer such as ammonium dichromate and the phosphor. The sensitized polyvinyl alcohol provides a good resist material for the production process. The slurry material is distributed over the face plate by tilting and rotating the face panel. After the slurry has been applied and the excess drained, the slurry is dried. The slurry coating is then exposed to suitable light rays to record the pattern of dots of a single color on the dried slurry layer. The exposure to light causes the slurry exposed to copolymerize and become insoluble to water. The unexposed portions of the slurry layer may then be removed by simply washing the tube with water leaving the pattern of dots. This procedure is then followed to deposit the other two colors within the three color type tube. The phosphor screen is then provided with an aluminum backing if desired and the structure is baked out to volatilize and remove the light hardened polyvinyl alcohol.

Typical phosphors utilized in color television tubes are described in U.S. Patent 3,243,625. The above patent points out that one limitation in light output from a color television tube is the inefficiency of the red phosphors. The above patent proposes the utilization of a more efficient red phosphor over that utilized in the prior art. The phosphor referred to in the patent is a vanadate of yttrium activated with europium or samarium. More efficient red phosphors are yttrium or gadolinium oxide activated with europium. The application of europium activated yttrium oxide or gadolinium oxide with the conventional slurry process described above results in a gelling of the polyvinyl alcohol due to the oxide in the phosphor. The formation of the gel before application of the slurry to the screen results in poor distribution of the phosphor and the slurry process is incompatible in providing a uniform coating of this phosphor material on the faceplate.

SUMMARY OF THE INVENTION

This invention is directed to the improved method of manufacturing and the product therefrom of a color television tube incorporating a red phosphor of yttrium oxide or gadolinium oxide europium activated provided with a protective coating about the phosphor particles. This protective coating such as $SiO_2$ provides a preventive gel forming coating in the absence of the photosensitizer on the phosphor particles during the manufacture in which the phosphor is applied by a slurry including polyvinyl alcohol. The resulting protective coating found in the final product does not substantially modify the light output nor the efficiency of the phosphor.

DESCRIPTION OF THE PREFERRED EMBODIMENT

Figure 1:
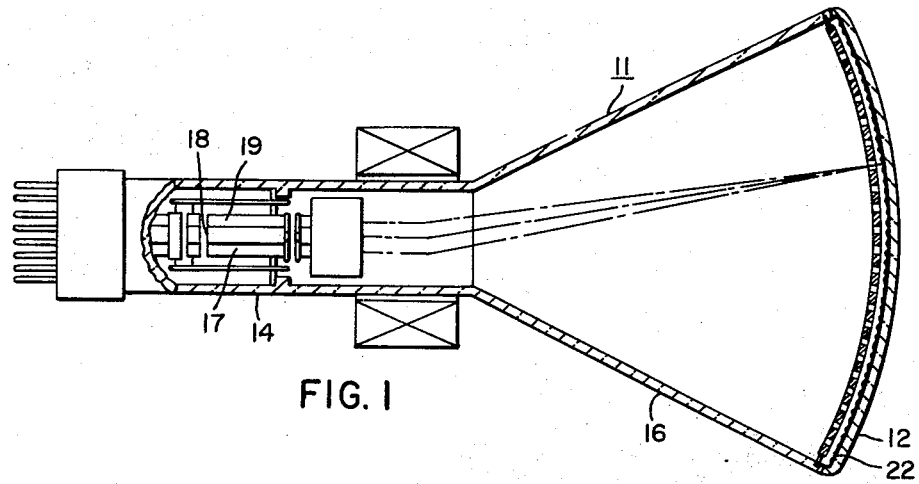
FIG. 1 is a sectional view of a color television tube including a display screen in accordance with the teachings of this invention.

The color television tube illustrated in FIG. 1 is generally conventional in construction with the exception of the screen and comprises an envelope 11 having a transparent faceplate panel portion 12, a neck portion 14 and a flared interconnecting portion 16 between the neck portion 14 and the face panel portion 12. A display screen 22 is provided on the inner surface of the faceplate portion 12. Three electron guns 17, 18 and 19 are provided in the neck portion 14 to project three individual electron beams which are each controlled by video signals representative of the colors green, blue and red, respectively. A mask member 20 is provided between the electron guns 17, 18 and 19 and the display screen 22 in a well known manner.

Figure 2:
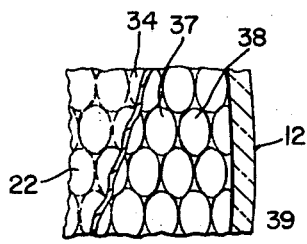
FIG. 2 is an enlarged perspective view of a portion of the display screen illustrated in FIG. 1.

This display screen 22 as shown in FIG. 2 consists of an arrangement of dots 37, 38 and 39 of phosphor material capable of emission of the colors green, blue and red respectively. Each dot 37, 38 and 39 is capable of emission of only one color. Each of the electron guns 17, 18 and 19 is directed onto only one of the colors so that an electron beam from each of the guns excites only one color. This mask type color television tube is well known in the art.

In the process of manufacturing, the screen structure 22 is provided on the face panel 12 prior to sealing the face panel 12 to the flared portion 16 of the envelope 11. The face panel 12 is mounted on a suitable holding means and a slurry of a suitable phosphor material is applied thereto. The slurry consists of the desired phosphor, a suitable bonding agent such as polyvinyl alcohol and a suitable photosensitizer such as ammonium dichromate as a suitable specific mixture. As previously indicated the green phosphor slurry may be flowed over the face panel 12 by any suitable means such as tilting and rotating to provide a layer of slurry material. This slurry material is then dried, exposed to light through the mask 20. The unexposed phosphor slurry is removed. The dots 37 remain on the face panel 12. The procedure is repeated for the blue phosphor and the dots 38 are deposited. A suitable process is described in articles by T. A. Saulnier in the January-February 1966 issue of Electrochemical Technology.

In the case of the red phosphor, the yttrium oxide or gadolinium phosphor is first mixed with a dilute solution of silicate or colloidal silica in water. A suitable silicate is an alkali silicate such as potassium silicate. In the case of the colloidal silica, this material may have particle size in range from 0.005 to .1 micron. The phosphor concentration in water may be varied between 30 to 50% by weight and the silicate to phosphor ratio may be varied from .001 to .02 by weight. This mix is kept under rapid agitation and then a few drops of a suitable acid salt such as potassium acid sulfate solution is added to the mixture to precipitate the silicate onto the phosphor particle surfaces. The phosphor particles may then be settled and washed with deionized water and dried at about 120° C. These coated phosphor particles may then be mixed in the phosphor slurry as previously described and applied to the phosphor screen to provide the phosphor dots 39. It is found that this phosphor slurry provides a good slurry coating without any gelling of the polyvinyl alcohol prior to application.

Figure 3:
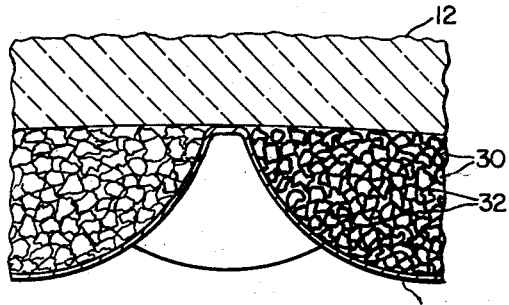
FIG. 3 is an enlarged sectional view of a portion of the display screen shown in FIG. 1.

In FIG. 3, there is illustrated the red phosphor particle 30 in which the preventive gel forming coating 32 is provided about the particle 30. After completion of the deposition of the three color phosphors, a metallic backing layer may be provided over the phosphors and the tube then processed in a suitable manner. It is normally necessary to provide a lacquer film over the phosphor dots structure prior to evaporating the metallic film 34 such as described in the Saulnier articles. In the bakeout of the tube the polyvinyl alcohol will be baked out but the dioxide coating 32 will remain about the phosphor particles 30 in the completed screen. It is found that this gel preventive coating 32 on the phosphor particles 30 in no way decreases the light emission from the phosphor or decreases the efficiency of the phosphor in response to electron bombardment.

Various modifications may be made without departing from the spirit and scope of the invention.

I claim:
1. The method of applying a phosphor particle material selected from the group consisting of yttrium oxide and gadolinium oxide activated by europium to a cathode ray tube faceplate comprising the steps of providing a gel formation preventive coating of a silicate material over said phosphor particles said silicate to phosphor ratio in the range of .001 to .02 by weight, mixing said coated phosphor particles with polyvinyl alcohol and a photosensitizer to form a slurry and then applying said slurry by flow coating the slurry over said faceplate.

2. The method of claim 1 in which said gel formation preventive coating is formed by mixing said phosphor particles with a dilute solution of a material selected from the group consisting of alkali silicate and colloidal silicate, the addition of an acid salt to the mixture of said phosphor and said dilute solution to precipitate the silicate onto the surface of said phosphor particles and then allowing said coated phosphor particles to settle, washing and then drying said coated phosphor particles to provide a silicidized gel formation preventive coating.

References Cited
UNITED STATES PATENTS

| | | | |
|---|---|---|---|
| 2,951,169 | 8/1960 | Faria et al. | 117—100 UX |
| 2,971,859 | 2/1961 | Sisneros et al. | 117—100 X |
| 3,408,223 | 10/1968 | Shortes | 117—100 |

ALFRED L. LEAVITT, Primary Examiner

J. R. BATTEN, JR., Assistant Examiner

U.S. Cl. X.R.

117—33.5 CM, 33.5 CP, 33.5 CS, 100 B; 252—301.3 R